Figure 1:
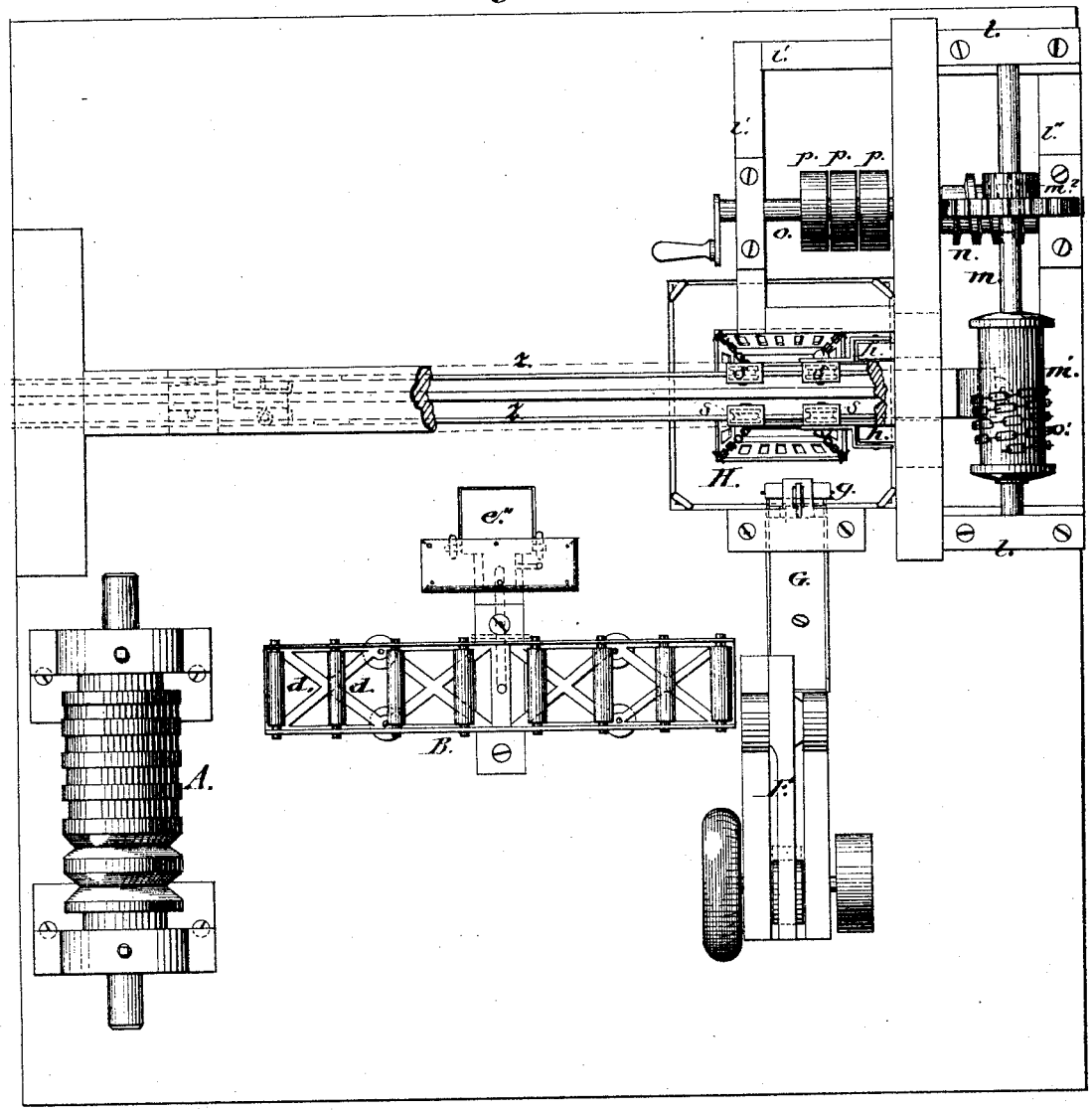

C. ZUG.
Muck Roll Appliances.

No. 153,995.  Patented Aug. 11, 1874.

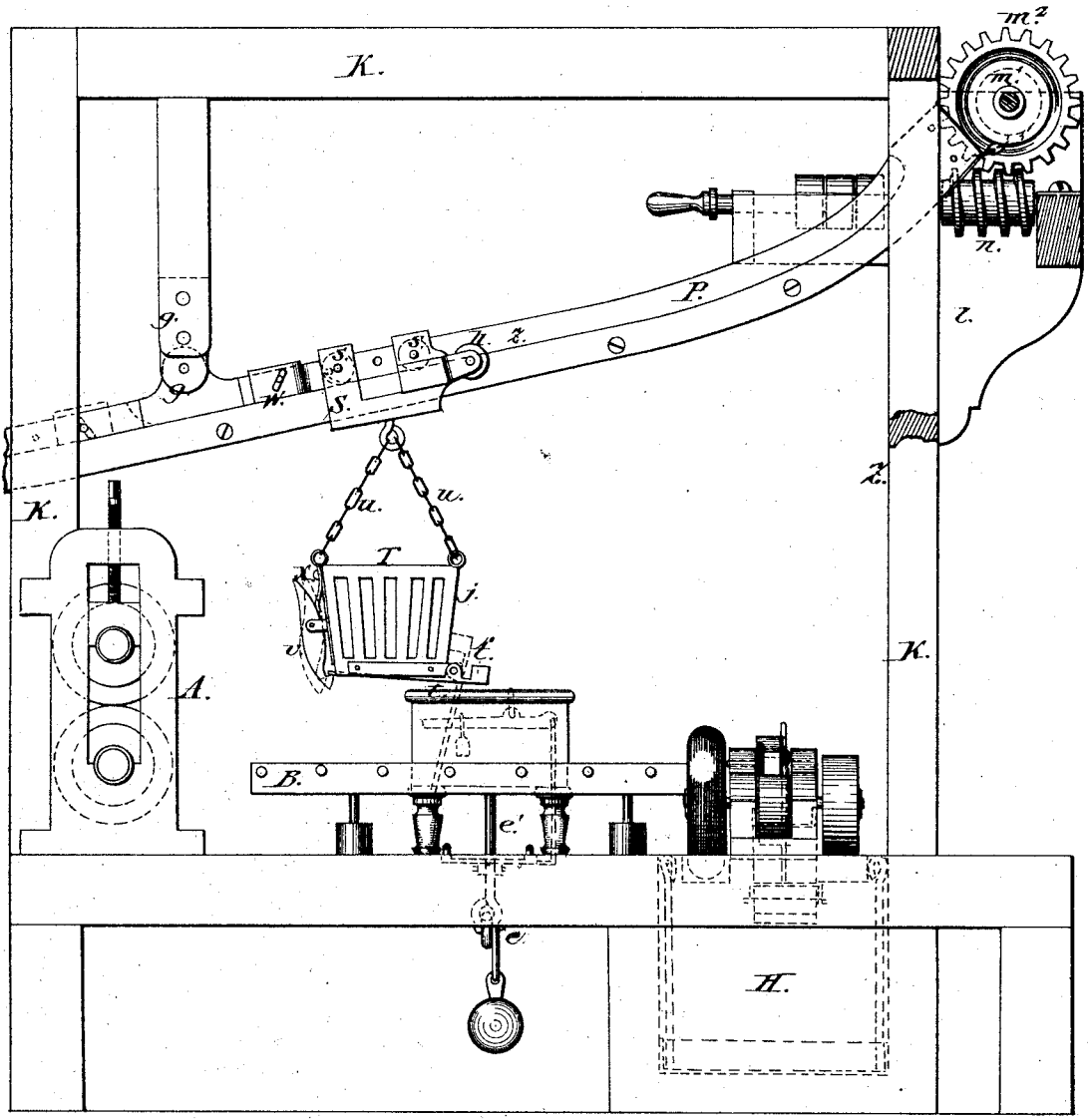

UNITED STATES PATENT OFFICE.

CHRISTOPHER ZUG, OF PITTSBURG, PENNSYLVANIA.

IMPROVEMENT IN MUCK-ROLL APPLIANCES.

Specification forming part of Letters Patent No. 153,995, dated August 11, 1874; application filed May 12, 1874.

*To all whom it may concern:*

Be it known that I, CHRISTOPHER ZUG, of the city of Pittsburg, in the county of Allegheny and State of Pennsylvania, have invented certain new and useful Improvements in Weighing and Shearing Iron from Muck-Rolls; and I do hereby declare the following to be a full, clear, and exact description of the invention, such as will enable others skilled in the art to which it pertains to make and use it, reference being had to the accompanying drawings, which form part of this specification.

My invention consists in certain combinations of mechanism, comprehending muck-rolls, a weighing-platform, provided with carrying-rollers, a pit, a basket, and an elevating and depressing tram-railway, in virtue of which mechanism the muck-bars, after passing through the muck-rolls for the last time, are carried to the weighing-platform, where their weight is ascertained, from thence passing to the shears to be cut into lengths suitable for piling. The pieces fall into a chute emptying into a basket placed in the pit, which is connected by chains with the elevating and depressing tram-railway, which lifts the basket when filled, and transports it to any desired place, where the contents are discharged automatically.

Figure 1 is a plan of the muck-mill. Fig. 2 is a side elevation.

A is a pair of ordinary muck-rolls. B is the bed of the scales, provided with a series of rollers, $d$, to facilitate the moving of the muck-bars. The scales (of the ordinary platform kind used for weighing coal, &c.,) are provided with a weighted lever, $e$, which operates an upright rod, $e'$, against the bed of the scales. The object of this arrangement is to relieve the bearings of the scales from the weight of the bed while not in use. It is operated by the attendant at the scales pressing upon the treadle $e''$, which lowers the rod $e'$, and allows the bed to rest upon the bearings. The iron or muck bars being weighed are passed over the rollers $d$ to the shears F, and are then cut into proper lengths for piling. The shears are of the usual kind, and are furnished with a gage to regulate the lengths of the bars. After being cut the pieces of muck-bar fall into the chute G, which extends from the shears downward at a steep incline, and opens into the pit or well H. The chute is closed at its lower end by means of the gate $g$, which prevents, when desired, the pieces of muck-bar from falling into the pit or well H. K K K represent a quadrangular frame-work of strong timbers securely joined together, elevated above the floor of the muck-mill. At one end are the brackets $l\ l$, which support in journal-bearings shaft $m$, to which are affixed drum $m^1$ and spur-wheel $m^2$. $l'\ l'\ l'$ is a frame-work extending out from the top of frame K K K, which, together with the beam $l''$, secured to brackets $l\ l$, give support in journal-bearings to the shaft $o$, carrying pulleys $p$, and endless screw $n$ gearing with spur-wheel $m^2$. Pulleys $p$ are connected with the motive power of the establishment, and, through the medium of the perpetual screw $n$ and spur-wheel $m^2$, communicates rotary motion to shaft $m$ and drum $m^1$. P is a curved tramway, hinged near one end to the hanger $g$, and at the other attached to a chain, $o'$, fastened to drum $m^1$. When the shaft $m$ is revolved chain $o'$ is wound upon drum $m^1$, thereby raising the curved end of the tram-railway P to the height of the drum. Reversing the rotation of the shaft, it is lowered as far as desired. S is a traveler, supported by means of wheels $s\ s\ s\ s$ on the tracks or rails $z\ z$ of the tram-railway P. It is designed to move freely backward and forward upon the tracks of the tram-railway as it is raised or lowered. The forward ends of the traveler S project forward on either side of the tram-railway and support two friction-wheels, $h\ h$, placed one on each side. T is a basket, made of iron, suspended by chains $u\ u\ u\ u$ from the traveler. It is provided with a hinged bottom, $t$, having a heavy weight, $t'$, back of the hinges, by the aid of which it is kept closed while the basket is empty. The bottom of the basket is secured by latch U, operated by spring X, attached to the front of the basket.

The operation of my invention is as follows: The drum $m^1$ being revolved unwinds the chain, thereby lowering the tram-railway, which causes the traveler S to advance forward down tracks $z\ z$, carrying with it basket T, until it reaches the upright guides Z Z, forming part of the frame K K. Between these guides the curved end of the tram-railway slides freely as it moves upward and downward. As the tram-railway descends the traveler's advance is stopped by the friction-wheels $h\ h$ abutting against guides Z Z, which thereby causes it to descend vertically, and thus lower the basket into well H until its top edge is below the level of the chute G. The pieces of bars cut by the shears fall into the chute, and pass downward into the basket. When the basket is filled the gate $g$ is closed to prevent the pieces of metal from falling into the well as they are cut by the shears, which are thus enabled to continue at work. The tram-railway is then elevated, and, as it ascends, the weight of the basket and its contents causes the traveler to slide backward on the tracks until it reaches the adjustable stop $w$, which prevents its further progress. At the same time the basket comes in contact with another stop, placed in a suitable position, which strikes the upper part of the latch $v$ and throws it back, releasing the bottom $t$, which falls, and the contents of the basket are cast on the ground. As soon as relieved from the weight the bottom of the basket closes automatically, the tram-railway is lowered, the basket descends as before, and the operation is repeated.

The well H is designed to be filled or partially filled with water, which cools the bars and frees them from their scales. These latter falling into the well are saved, and afterward gathered up for the use of the puddler. In addition to this advantage is the additional one which is found to accrue to muck-bar by immersing them in water at this stage.

Owing to the intense heat prevailing around the muck-rolls, the old method of working the bars was attended with a great deal of inconvenience and trouble; but by the system I have herein described much, if not all, of this is overcome. The manipulation of the bars from the time of leaving the rolls until finally deposited for piling is almost entirely automatic, requiring but little close contact with the heated bars by the workmen. This, of course, effects a decrease in the expense of the mill, as much of the work being done by machinery the labor of several hands can be dispensed with. Something else also is gained by dispensing with what is known in muck-mills as the "bunk" for muck-bars.

I am aware that elevating and depressing tram-railways have been used, and also that buckets with self-closing bottoms, though not provided with a device for automatically fastening and unfastening the same, are not new. I do not, therefore, claim, broadly, these devices.

Having thus described my invention, what I claim as new, and desire to secure by Letters Patent, is—

1. The combination of the muck-rolls A, transfer and weighing roller platform B, and shears F, substantially as and for the purpose hereinbefore described and set forth.

2. The combination of the muck-rolls A, transfer and weighing platform B, shears F, chute G, and well H, substantially as and for the purpose hereinbefore described and set forth.

3. The curved elevating and depressing tram-railway P, furnished with the carrier S and basket T, whose bottom is automatically opened for the discharge of its load, and resets itself for receiving a fresh load, in combination with the chute G and well H, substantially as and for the purpose hereinbefore set forth.

In testimony that I claim the foregoing I have hereunto set my hand this 25th day of April, 1874.

CHRISTOPHER ZUG.

Witnesses:
W. J. TROTH,
WM. LITTLE.